(12) United States Patent
Yamada et al.

(10) Patent No.: US 7,421,384 B2
(45) Date of Patent: Sep. 2, 2008

(54) SEMICONDUCTOR INTEGRATED CIRCUIT DEVICE AND MICROCOMPUTER DEVELOPMENT SUPPORTING DEVICE

(75) Inventors: Kenji Yamada, Nukata-gun (JP);
Hideaki Ishihara, Okazaki (JP);
Kyouichi Suzuki, Toyohashi (JP);
Yoshinori Teshima, Toyota (JP);
Toshihiko Matsuoka, Nukata-gun (JP);
Naoki Ito, Nukata-gun (JP)

(73) Assignee: DENSO CORPORATION, Kariya (JP)

( * ) Notice: Subject to any disclaimer, the term of this patent is extended or adjusted under 35 U.S.C. 154(b) by 455 days.

(21) Appl. No.: 11/000,902

(22) Filed: Dec. 2, 2004

(65) Prior Publication Data

US 2005/0125214 A1 Jun. 9, 2005

(30) Foreign Application Priority Data

Dec. 8, 2003 (JP) ............................. 2003-408944

(51) Int. Cl.
*G06F 9/455* (2006.01)
*G06F 11/00* (2006.01)
*G06F 15/00* (2006.01)
*G06F 15/76* (2006.01)
*G06F 19/00* (2006.01)
*G01R 31/28* (2006.01)
*G01R 27/28* (2006.01)
*G01R 31/00* (2006.01)
*G01R 31/14* (2006.01)

(52) U.S. Cl. .............................. 703/28; 714/28; 714/31; 714/34; 714/726; 714/727; 714/733; 714/734; 712/35; 712/39; 712/40; 702/117; 702/118

(58) Field of Classification Search .................. 703/28; 714/31, 34, 726, 727, 733, 734; 712/35, 712/39, 40; 702/117, 118

See application file for complete search history.

(56) References Cited

U.S. PATENT DOCUMENTS 5,357,626 A * 10/1994 Johnson et al. ................ 714/33
5,566,303 A * 10/1996 Tashiro et al. ............... 710/100
6,075,941 A 6/2000 Itoh et al.

FOREIGN PATENT DOCUMENTS

| JP | A-02-130640 | 5/1990 |
|---|---|---|
| JP | A-11-65884 | 3/1999 |
| JP | A-2000-132419 | 5/2000 |
| JP | A-2001-306357 | 11/2001 |

OTHER PUBLICATIONS

"Read-Only Memory (ROM)" Aug. 17, 2000. Verified by wayback machine. http://web.archive.org/web/20000817085823/http://www.pcguide.com/ref/ram/typesROM-c.htm.*
Patavalis, Nick; "A Brief Introduction to the JTAG Boundary Scan Interface" Athens Nov. 8, 2001. Verified by Wayback Machine.*
Notice of Rejection dated Oct. 30, 2007 in the corresponding Japanese Patent Application No. 2003-408944 (and English translation).

* cited by examiner

*Primary Examiner*—David Vincent
*Assistant Examiner*—Ben M Rifkin
(74) *Attorney, Agent, or Firm*—Posz Law Group, PLC

(57) ABSTRACT

During software development, a multichip module is used which encloses a target chip and a development chip in one package. A CPU of the development chip fetches instructions from a flash memory in the chip to execute them, and accesses RAM and peripheral circuits in the chip. For motor control circuits that exist only in the target chip, the CPU accesses them via serial communication. When the one-chip microcomputer operates alone, its CPU switches a switching circuit to a JTAG interface side to actuate a motor control circuit via internal serial communication.

3 Claims, 3 Drawing Sheets

SEMICONDUCTOR INTEGRATED CIRCUIT DEVICE AND MICROCOMPUTER DEVELOPMENT SUPPORTING DEVICE

CROSS REFERENCE TO RELATED APPLICATION

This application is based upon, claims the benefit of priority of, and incorporates by reference the contents of Japanese Patent Application No. 2003-408944 filed on Dec. 8, 2003.

FIELD OF THE INVENTION

The present invention relates to a semiconductor integrated circuit device that is used in connection to a host during software development and is suitable for supporting the development of software to be stored in a mask ROM in a microcomputer chip, and a microcomputer development supporting device employing the semiconductor integrated circuit device suitable for supporting the development.

BACKGROUND OF THE INVENTION

Microcomputers for debugging that are mounted on a printed board are disclosed in, for example, JP-A-H10-214201 and JP-A-H11-065884. A microcomputer described in JP-A-H10-214201, which eases the development of a program to be stored in an incorporated ROM, comprises a flash memory in which a program under development is stored, and a dedicated input-output terminal for connection to an external ICE. The microcomputer incorporates a debugging circuit having a function of communication with a CPU, a function of communication with the ICE, a trace function, a break function, a function to write program code from the ICE to the flash memory, and a function to send the contents of the flash memory to the ICE.

A microcomputer described in JP-A-H11-065884 comprises a flash ROM, a memory in which a debug program for debugging a program stored to be stored in the flash ROM is stored, and a switching circuit for permitting the CPU to execute the debug program during debugging, thereby enabling debugging without using an in-circuit emulator.

In a target debugging supporting system described in JP-A-2001-306357, an arithmetic and control unit in a target system loads a comparatively simple program for performing communication between an interface for an emulator and a memory into an empty storage area of a working memory of the target system by the emulator, whereby a central processing unit of the target system performs communication with the memory. The interface for the emulator is simplified, and as a result, efficient program modifications can be performed.

A technique as shown in FIG. 4A is used as a software development environment of conventional one-chip microcomputers. According to this technique, a program rewritable memory, e.g., a flash memory 2, is incorporated in a one-chip chip microcomputer 1, and an external device such as an ICE (not shown) controls execution states of a program stored in the flash memory 2 while performing serial communication with the one-chip chip microcomputer 1. In recent years, the number of JTAG devices into which a boundary scan function conforming to IEEE 1149.1 standard (JTAG) is built has been increasing.

Use of this technique only increases the number of IC pins by no more than five pins involved in the addition of the JTAG. However, since the flash memory 2 is constructed to be larger in layout size than a mask ROM, it is difficult to use the same package as a package in which the mask ROM is incorporated at mass production, thus resulting in a problem of package size and terminal pitch being different between stages at software development and at mass production. This problem rarely occurs in the use of a CMOS process with advanced development in minuteness but is serious in an SOI device that employs the trench isolation technology, for example.

Accordingly, as a technique for avoiding such a problem, as shown in FIG. 4B, software development is made using a multichip 3 which encloses a mass-production one-chip microcomputer 4 incorporating a mask ROM 5 and a development chip 6 incorporating a flash memory 7 and a JTAG function in one package. In this case, the mass-production chip 4 is manufactured as an SOI device and the development chip 6 is manufactured as a CMOS device with advanced development in minuteness, whereby the package of the multichip 3 can be sized substantially equally to the mass-production chip 4.

However, because the mass-production chip 4 must perform interchip communication with the development chip 6 incorporating the flash memory 7, the mere multichip construction increases the number of IC terminals to provide the various signal terminals. If serial communication is performed between the chips to avoid this problem, the number of operation cycles may differ in comparison with the case where the mass-production one-chip microcomputer 4 operates alone. Also, limitations in communication may cause the need to reduce program execution speed. Such a problem occurs not only in software development but also in hardware tests on the mass-production chip 4 by use of an IC tester.

SUMMARY OF THE INVENTION

The present invention has been made in view of the above circumstances, and provides a semiconductor integrated circuit device for supporting development that, during the development of software of a microcomputer incorporating a mask ROM, enables operation verification while holding the same operation conditions as those during actual operation of the microcomputer, a semiconductor integrated circuit device for implementing the above-mentioned microcomputer chip, and a microcomputer development supporting device employing the semiconductor integrated circuit device for supporting development.

According to a first aspect, the first microcomputer chip, which incorporates a mask ROM, is finally mass-produced and mounted on a board or the like. On the other hand, the second microcomputer chip has a function circuit (architecture) equivalent to the first microcomputer chip, and incorporates a rewritable nonvolatile memory. When software to be written to the mask ROM of the first microcomputer chip is developed, the second microcomputer chip constitutes a semiconductor integrated circuit device being a multichip, together with the first microcomputer chip.

During software development, the multichip is mounted on the board and connected to an external device (ICE, IC tester, etc.). The second microcomputer chip, via the second serial communication means, inputs and outputs programs and data for debugging and testing from and to the external device. In this case, instead of a CPU of the first microcomputer chip, a CPU of the second microcomputer chip fetches and executes a program to be developed that is stored in the rewritable nonvolatile memory. Since this means memory access within the same chip, the same cycle operation as at the case where the first microcomputer chip fetches instructions from the mask ROM to execute them is performed.

On the other hand, for function circuits (hereinafter referred to as specific function circuits) that can be provided in the first microcomputer chip but cannot be provided in the second microcomputer chip because of different manufacturing processes, according to a third aspect, the CPU of the second microcomputer chip accesses the specific function circuits provided in the first microcomputer chip by communication between a first serial communication means of the second microcomputer chip and the second serial communication means of the first microcomputer chip. As a result, function circuits provided commonly to both the chips can be subjected to operation verification by circuits in the second microcomputer chip, while specific function circuits provided only in the first microcomputer chip can be subjected to operation verification by circuits in the first microcomputer chip.

However, such serial communication between the chips yields a time delay in the communication and differences of operation cycles between at software development and at the operation of the first microcomputer chip alone in an actual product. Accordingly, when the first microcomputer chip is singly mounted on the board to operate, the CPU conducts communication for timing adjustment between the first serial communication means and the second serial communication means within the chip before accessing the specific function circuits. As a result, the influence of the above-mentioned delay time and operation cycles can be eliminated, and operation verification can be performed while identical operation conditions are maintained between development environment and product environment.

According to a second aspect, since the first and the second microcomputer chips are manufactured by different semiconductor manufacturing processes, the second microcomputer chip incorporating the rewritable nonvolatile memory that tends to become larger in layout size is manufactured using semiconductor manufacturing processes capable of achieving a higher level of minuteness than for the first microcomputer chip. That can make the package size of the multichip identical with the package size of the first microcomputer, so that identical pin layout can be achieved between the multichip and the microcomputer chip.

According to a fourth aspect, since the second serial communication means of the first and the second microcomputer chips are connectable to an external device such as an IC tester, when the first microcomputer chip mounted on the board operates alone in an actual product, internal tests on the first microcomputer chip can be run by selecting communication between the second serial communication means and the external device.

According to a fifth aspect, since the semiconductor integrated circuit device of multichip construction has the same package size and the same terminal layout as the first microcomputer chip, a board for a product can be used unchangeably for software development and functional tests.

According to a sixth aspect, regarding the semiconductor integrated circuit device (the above-mentioned first microcomputer chip), since a flash memory does not need to be mounted for software development as described above, a chip can be miniaturized advantageously in terms of package size and costs. Also, software development can be easily made using a semiconductor integrated circuit device (multichip) according to any one of the first to fifth aspects, and operation verification can be made while holding identical operation conditions between development environment and product environment.

According to a seventh aspect, regarding the microcomputer development supporting device, even if the flash memory for software development is not mounted on the first microcomputer chip being a product as described above, by mounting the above-mentioned multichip instead of the first microcomputer on a target board and connecting the multichip and a host, software development and various tests on the first microcomputer chip can be performed. In this case, operation verification can be performed while holding identical operation conditions between development environment using a microcomputer development supporting device and product environment.

BRIEF DESCRIPTION OF THE DRAWINGS

FIG. 4A is a drawing showing a one-chip construction and FIG. 4B is a drawing a showing multichip construction.

DETAILED DESCRIPTION OF THE PREFERRED EMBODIMENTS

Figure 1:
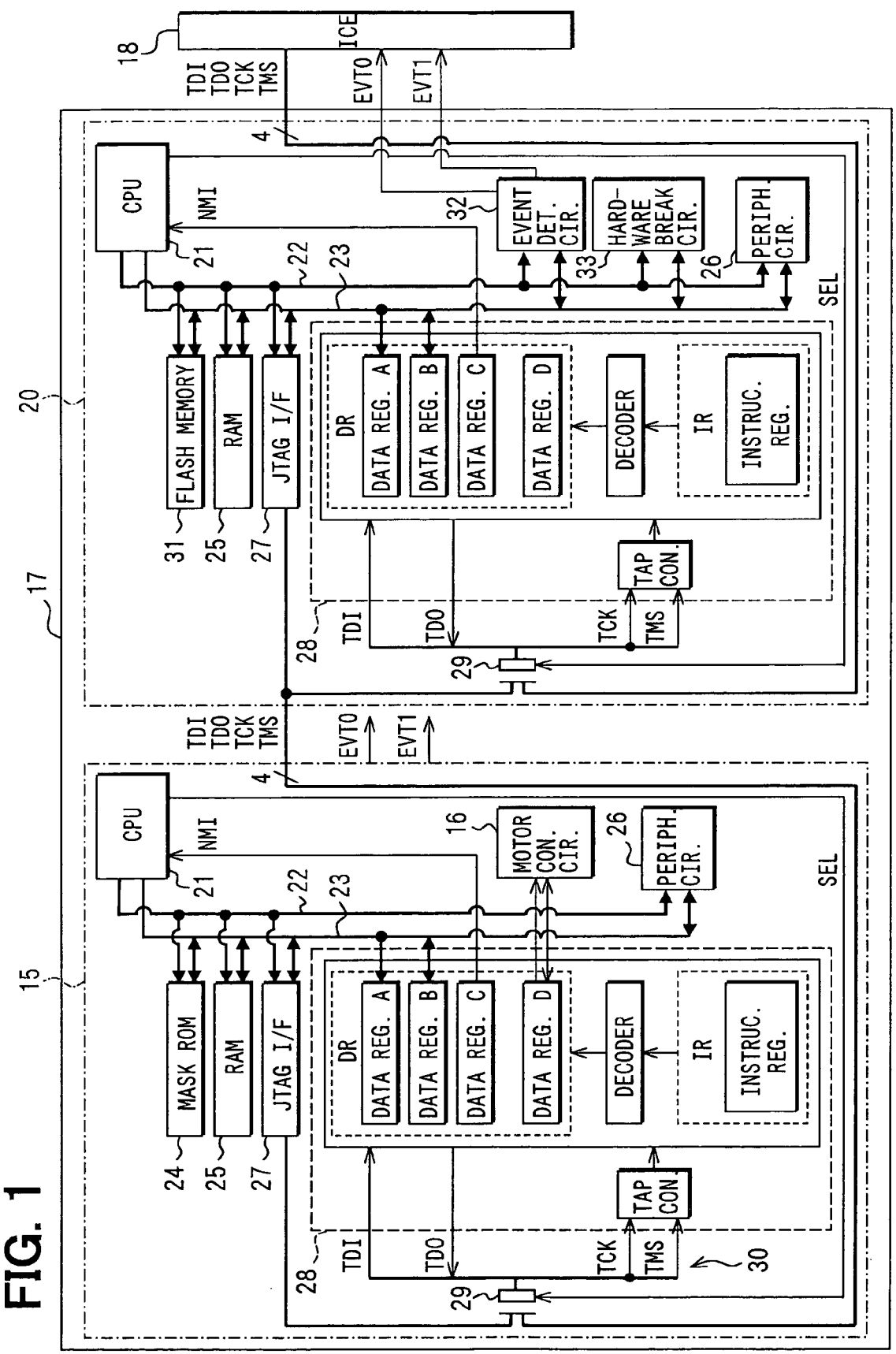
FIG. 1 is a block diagram of an electric construction of a multichip module according to a first embodiment.
Figure 2:
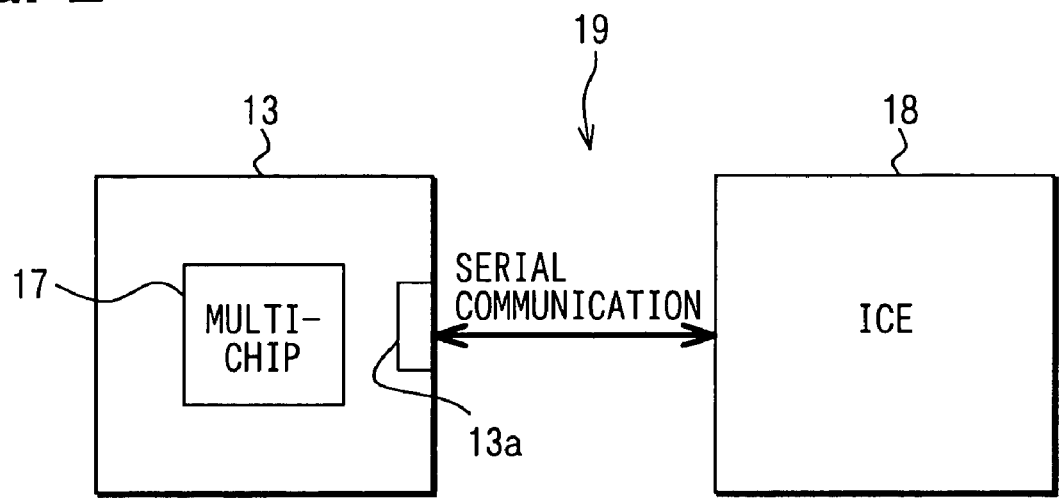
FIG. 2 is a block diagram of an exemplary software development environment of a one-chip microcomputer.
Figure 3:
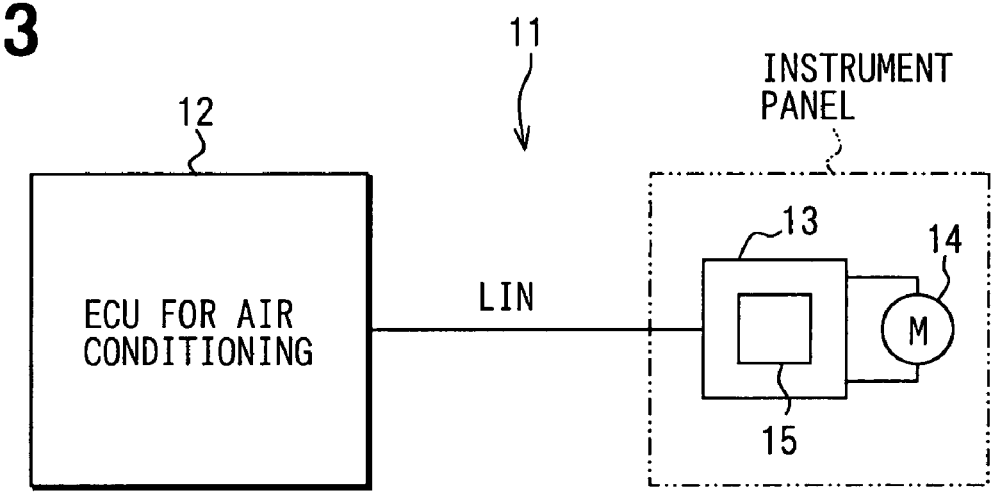
FIG. 3 is a block diagram of a portion relating to motor control of an air conditioner for a vehicle.
Figure 4A:
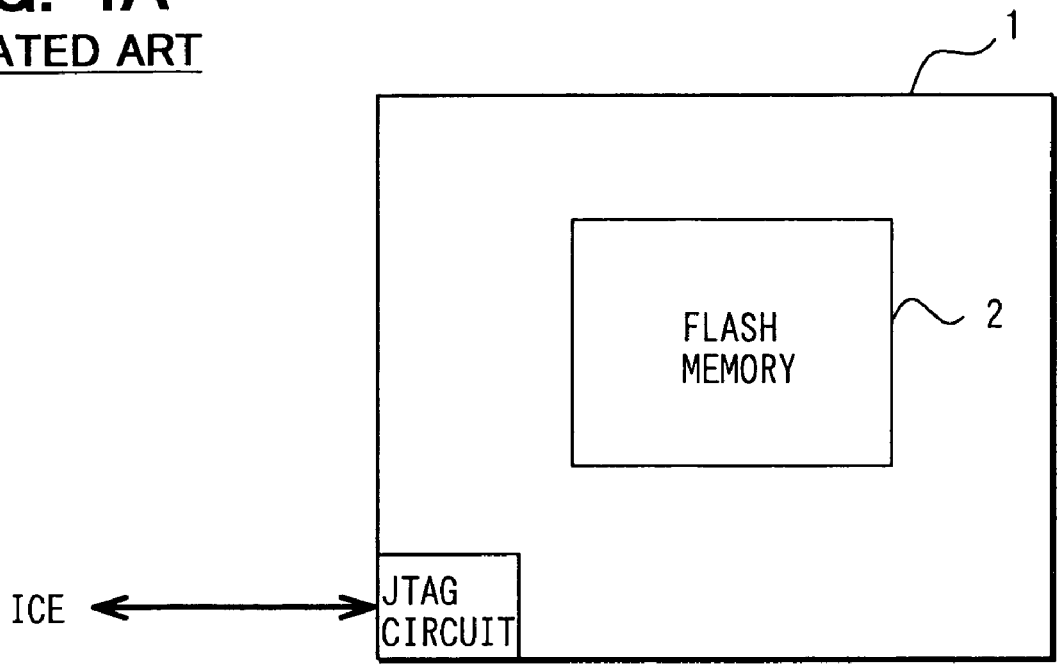
FIGS. 4A and 4B are illustrations of related art chips used for program development.
Figure 4B:
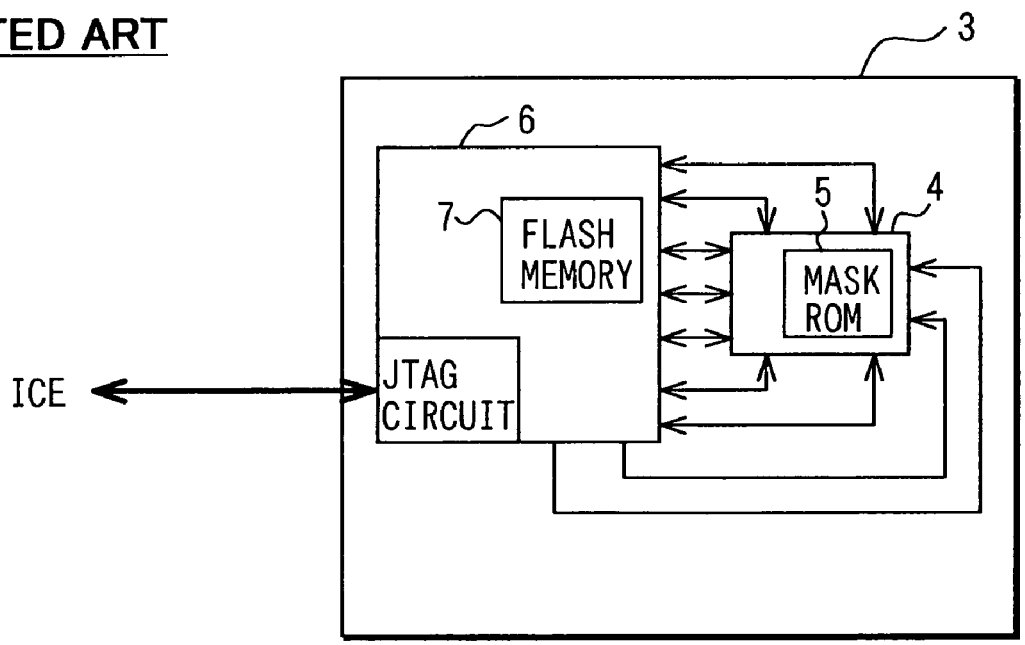

Referring to FIGS. 1-3, preferred embodiments of the present invention will be described.

FIG. 3 shows a schematic electric construction of a portion of a device related to motor control of an air conditioner for vehicle. An air conditioner for a vehicle 11 comprises an ECU (Electronic Control Unit) 12 for air conditioning, a control board 13 connected to the ECU 12 for air conditioning by a LIN (Local Interconnect Network), and a motor 14 connected to the control board 13. The control board 13 and the motor 14 (only one pair is shown in FIG. 3) are provided in close proximity to each other in a vehicle instrument panel (vehicle dashboard).

A one-chip microcomputer 15 is mounted on the control board 13. The one-chip microcomputer 15 (equivalent to a semiconductor integrated circuit device) incorporates a motor control circuit 16 having enough current output capability to directly drive a compact motor 14 (see FIG. 1), and drives the motor 14 upon receiving a command from the ECU 12 for air conditioning. In the description that follows, the one-chip microcomputer is referred to as a target chip 15 when it denotes the chip itself in relation to a multichip module 17 described later.

FIG. 2 shows a software development environment for the one-chip microcomputer 15 mounted on the control board 13. During software development that includes debugging operations, a multichip module 17 (equivalent to a semiconductor integrated circuit device) is provided in place of the one-chip microcomputer 15 mounted on the control board 13, and the multichip module 17 and the ICE 18 (equivalent to an external unit) are connected via the connector 13a of the control board 13. The microcomputer development supporting device 19 is comprised of the multichip module 17 and the ICE 18.

Referring to FIG. 1, the multichip module 17 has the target chip 15 (equivalent to a first microcomputer chip) being the chip itself, and a development chip 20 (equivalent to a second microcomputer chip) that are enclosed in one package. The package size and pin layout (number of pins, pitch, etc.) of the multichip module 17 are the same as those of the one-chip microcomputer 15.

The target chip 15 (one-chip microcomputer) is an SOI device, and is manufactured by a trench isolation process. The trench isolation SOI has no device parasitic transistor, eases circuit design and pattern layout, and has high pressure resistance, high-temperature operation capability, and high noise immunity. Therefore, the trench isolation SOI is suitable as an intelligent power IC for automotive motor control and the like, and can contain the motor control circuit 16 having a large current power capability as described above.

A mask ROM 24, a RAM 25, a peripheral circuit 26, a JTAG interface 27, and a JTAG circuit 28 are connected to a CPU 21 of the target chip 15 via an address bus 22, a data bus 23, and a control bus (not shown). The peripheral circuit 26 is a LIN driver, a counter (timer), and an input-output port, an analog-to-digital converter, or the like that is provided as required. A program having been developed by the microcomputer development supporting device 19 is stored in the mask ROM 24 of the one-chip microcomputer 15 at mass production.

The JTAG circuit 28 is a circuit conforming to the IEEE 1149.1 communication protocol. The circuit comprises an instruction register (IR), a bypass register, data registers as optional registers (DR), and a TAP controller that controls the registers.

The data registers, which are connected to the motor control circuit 16 being an internal logic, the address bus 22, and the data bus 23, outputs an NMI signal to the CPU 21. The JTAG circuit 28 is a serial interface for inputting and outputting instructions, test data, and data of test results, and has various signal lines such as TDI (Test Data In), TDO (Test Data Out), TCK (Test Clock), and TMS (Test Mode Select).

The JTAG interface 27 is an interface circuit for performing serial communication with the JTAG circuit 28 in the chip, and is equivalent to a first serial communication means. A switching circuit 29, during serial communication with the JTAG circuits 28, performs switching between signal lines from the JTAG interface 27 and signal lines from the development chip 20 according to a selection command SEL from the CPU 21. A serial communication circuit 30 (equivalent to a second serial communication means) is comprised of the TAP of the JTAG circuit 28 and the switching circuit 29.

On the other hand, the development chip 20 is manufactured by a CMOS process, and has the same architecture as the target chip 15 in a range that can be manufactured by the CMOS process. Therefore, the CPU 21, and the RAM 25, the peripheral circuit 26, and the like that are connected with the CPU 21 via the address bus 22 and the data bus 23 operate the same as the target chip 15. However, the development chip 20 is not provided with the motor control circuit 16 having a large current output capability. The development chip 20 is used only in the multichip module 17 for software development.

The development chip 20 incorporates a flash memory 31 (equivalent to a rewritable nonvolatile memory) instead of the mask ROM so that software development can be made while rewriting the program. It further incorporates an event detection circuit 32 and a hardware break circuit 33. The event detection circuit 32 outputs event signals EVT0 and EVT1 to the ICE 18. The target chip 15 not provided with the event detection circuit 32 also formally has output terminals for the event signals EVT0 and EVT1.

Similarly to the target chip 15, the development chip 20 is provided with the JTAG interface 27, the JTAG circuit 28, and the switching circuit 29. The switching circuit 29 is only provided because the development chip 20 is designed to have the same architecture as the target chip 15; it is originally an omissible circuit. The switching circuit 29 is switched to enable constant serial communication between TAP of the JTAG circuit 28 (equivalent to a second serial communication means) and the ICE 18. The JTAG interface 27 (equivalent to the first serial communication means) conducts serial communication with the TAP of the target chip 15.

The following describes the operation of the multichip module 17 in software development and the operation of the one-chip microcomputer 15 itself.

For software development (program debugging), as shown in FIG. 2, the control board 13 is provided with a multichip module 17 instead of the one-chip microcomputer 15. Since the one-chip microcomputer 15 and the multichip module 17 are identical in package size and pin layout, the design of the control board 13 does not need to be changed. By connecting four signal lines TDI, TDO, TCK, and TMS from the development chip 20 of the multichip module 17 with the ICE 18 via the connector 13a of the control board 13, the microcomputer development supporting device 19 becomes available for use.

For the duration of program debugging, the CPU 21 of the target chip 15 is halted, and the switching circuit 29 of the target chip 15 is switched to enable communication with the development chip 20. On the other hand, the CPU 21 of the development chip 20 stores the program received from the ICE 18 via the JTAG circuit 28 in the flash memory 31. The CPU 21 of the development chip 20 fetches instructions from the flash memory to execute them while exchanging trace addresses, break addresses, and register data, various statuses, event condition data, and the like with the ICE 18 via the JTAG circuit 28.

In this case, the CPU 21 of the development chip 20 accesses the RAM 25 and the peripheral circuit 26 in the development chip 20. However, since the development chip 20 has the same architecture as the target chip 15 except the motor control circuit 16, operation verification by use of the development chip 20 would provide substantially the same verification results as operation verification by use of the target chip 15, including operation cycles.

However, when access to the motor control circuit 16 occurs, the CPU 21 of the development chip 20 must communicate with the target chip 15 via the JTAG interface 27 to access the motor control circuit 16 formed only in the target chip 15. Accordingly, a program to be developed must be coded to control the motor control circuit 16 over serial communication. In this case, actual control of the motor control circuit 16 after command issuance from the CPU 21 is delayed by time required for the communication.

To eliminate the influence by communication time, the motor control circuit 16 is accessed over serial communication in the chip not only during program debugging by use of the multichip module 17 but also during the operation of the one-chip microcomputer 15 itself that stores the developed program in the mask ROM 24. Specifically, the CPU 21 of the one-chip microcomputer 15 switches the switching circuit 29 to the JTAG interface 27 side to actuate the motor control circuit 16 via serial communication between the JTAG interface 27 and the JTAG circuit 28 according to the developed program.

By this construction, the timing of access (operation cycles) of the CPU 21 to the motor control circuit 16 can be matched between during program development by use of the microcomputer development supporting device 19 and during the operation of the one-chip microcomputer 15 in the air conditioner for vehicle 11 after the development.

As described above, in this embodiment, when software development is made on the one-chip microcomputer 15 that incorporates the mask ROM 24 and is manufactured by the trench isolation process, the multichip module 17 which encloses the target chip 15 and the development chip 20 in one package is used. Here, the development chip 20 is manufactured by a CMOS process that enables a higher level of minuteness than the trench isolation process.

The development chip 20 includes a flash memory 31 that tends to become larger in layout size than the mask ROM. Still, it has a smaller chip size than the target chip 15. Therefore, the multichip module 17 has the same package size and pin layout as the target chip 15. Mere replacement of the mask ROM 24 of the one-chip microcomputer 15 by the flash memory 31 hardly results in the packages being identically sized, and conventional software development by use of the development chip requires that the design of the control board 13 be changed.

During software development, the CPU 21 of the development chip 20 fetches instructions from the flash memory 31 in the same chip to execute them. Therefore, without a decrease in program execution speed, operation can be verified in the state in which the same access speed as the operation of the one-chip microcomputer 15 in the air conditioner for the vehicle 11 is maintained.

The CPU 21 of the development chip 20 can also verify the operation of the motor control circuit 16 that cannot be manufactured by a CMOS process because of constraints on current capacity and the like, over serial communication, using the motor control circuit 16 in the target chip 15. Also in the case where the one-chip microcomputer 15 operates in the air conditioner 11 for a vehicle, since the motor control circuit 16 is actuated over internal serial communication, the timing of access to the motor control circuit 16 can be made identical with that during program development. The motor control circuit 16 is a function circuit that is not subjected to severe constraints on execution speed and is permitted for some delay in motor driving after instruction execution by the CPU 21.

Since the development chip 20 incorporates the JTAG circuit 28 conforming to the IEEE 1149.1 communication protocol, it can use relevant functions during software development. Since the one-chip microcomputer 15 also incorporates the JTAG circuit 28, if the switching circuit 29 is switched to the external terminal side and an IC tester is connected to the external terminal, an internal test can be run on the one-chip microcomputer 15.

Another Embodiment

As another embodiment, a clock facility of serial communication is halted by resetting the development chip, and a clock frequency of serial communication is detected to be below a prescribed value by a CR oscillator incorporated in the target chip. By this construction, reset control of the development chip can be synchronized to the target chip without adding terminals.

The present invention is not limited to the above description and the embodiments shown in the drawings, and may be modified or expanded as described below.

Although the target chip 15 and the development chip 20 are provided with the JTAG circuit 28 and use their TAPs as second serial communication means, the JTAG circuit 28 need not necessarily be provided and a special serial interface may be provided.

The target chip 15 and the development chip 20 are not limited to those described above and may be manufactured by an identical manufacturing process.

What is claimed is:

1. A semiconductor integrated circuit device used in connection to an external device during software development, comprising:
   a first microcomputer chip; and
   a second microcomputer chip having functional circuits substantially equivalent to the first microcomputer chip, the second microcomputer chip coupled to the external device for receiving and transmitting data;
   wherein the first microcomputer chip includes:
      a mask read only memory (ROM) including instructions;
      a central processing unit (CPU) coupled to the mask ROM for executing the instruction to thereby configure the CPU;
      a Joint Test Action Group (JTAG) circuit coupled to the CPU, the JTAG circuit configured to generate and receive test related data and instructions;
      a motor control circuit configured to drive a motor in response to instructions from the JTAG circuit;
      a JTAG interface for performing serial communication between the CPU and the JTAG circuit; and
      a switching circuit selectively coupling a signal line from the JTAG circuit to one of a signal line from the second microcomputer chip and a signal line from the JTAG interface, the switching circuit controllable by the CPU; and
   wherein the second microcomputer chip includes:
      a rewritable nonvolatile memory to which instructions are written;
      a CPU coupled to the rewritable nonvolatile memory that executes the instructions during software development to thereby configure the CPU; and
      a JTAG interface for performing serial communication between the CPU and the JTAG circuit of the first microcomputer chip, wherein a signal line from the JTAG interface is the signal line from the second microcomputer chip selectively coupled to the switching circuit of the first microcomputer chip,
   wherein the CPU of the first microcomputer chip is configured to be in a halt state and to control the switching circuit to couple the signal line from the JTAG circuit of the first microcomputer chip to the JTAG interface of the second microcomputer chip to thereby permit actuation of the motor control circuit by the second microcomputer chip while the CPU of the second microcomputer chip executes the instructions during the software development.

2. The semiconductor integrated circuit device according to claim 1, wherein the CPU of the first microcomputer chip is configured to control the switching circuit to couple the signal line from the JTAG circuit of the first microcomputer chip to the JTAG interface of the first microcomputer chip to thereby permit actuation of the motor control circuit by the first microcomputer chip while the CPU of the first microcomputer chip executes the instructions stored in the mask ROM during normal operation.

3. The semiconductor integrated circuit device according to claim 1, wherein the first microcomputer chip is a silicon-on-insulator (SOI) device and the second microcomputer is a complementary metal-oxide-semiconductor (CMOS) device.

* * * * *